United States Patent [19]

Jung

[11] 4,358,924
[45] Nov. 16, 1982

[54] CHAIN WITH TOGGLE FASTENER

[76] Inventor: Ernst Jung, Scheibenstrasse 49, 4000 Düsseldorf 30, Fed. Rep. of Germany

[21] Appl. No.: 135,832

[22] Filed: Mar. 31, 1980

[30] Foreign Application Priority Data

Apr. 5, 1979 [DE] Fed. Rep. of Germany ....... 2913632

[51] Int. Cl.³ .............................................. F16G 15/08
[52] U.S. Cl. .......................................... 59/82; 63/21; 224/176; 59/93
[58] Field of Search ...................... 59/80, 82, 93; 63/4, 63/21, 22; 224/172, 176; 24/3 B, 3 E, 3 J, 9, 241 R, 241 SP

[56] References Cited

U.S. PATENT DOCUMENTS 178,451 6/1876 Mabie ...................................... 63/22
268,102 11/1882 Horton ................................... 63/22

Primary Examiner—Mark Rosenbaum
Assistant Examiner—Timothy U. Eley
Attorney, Agent, or Firm—Martin A. Farber

[57] ABSTRACT

Chain with toggle fastener, in which the toggle is developed as a hollow rail in which the end of the chain is pivotally connected and the free cross section of which corresponds essentially to the cross sectional area of the chain.

10 Claims, 3 Drawing Figures

CHAIN WITH TOGGLE FASTENER

The present invention relates to a chain with toggle fastener.

In the known chains of this type, the toggle consists of a short profiled bar to approximately the middle of which the end of the chain is fastened and which in order to close the chain is pulled through a suitably developed chain link or through a specially introduced toggle ring and suspended therein. The free cross section of the chain link or the diameter of the toggle ring as a rule constitutes a multiple of the sum of the diameters of the chain and bar so that the toggle fastener is easily operated. In the case of heavy large-link chains such as, for instance, used in agriculture, handling is therefore generally simple. In the case of small-link jewelry chains, on the other hand, greater dexterity is required for the attaching and removal of the chain unless the overall aesthetic impression of the chain is to be disturbed by a development of the toggle fastener which is excessively large as compared with the rest of the chain. Furthermore, the lack of a safety in the case of such a chain contributes to the fact that up to now the toggle fastener has not been able to gain acceptance, particularly in the case of jewelry chains.

The object of the present invention is to develop a chain having a toggle fastener in such a manner that easy and dependable operation is assured even with the smallest dimension of chain and fastener.

This objective is achieved in accordance with the invention in a chain of the aforementioned type in the manner that the toggle is developed as a hollow rail in which the end of the chain is pivotally connected and the (i.e., the open area inside of and defined by the inner periphery of the toggle) of which corresponds essentially to the cross sectional area of the chain.

In this way the toggle can be swung completely into the longitudinal axis of the chain, whereby it can be pulled dependably and easily through a chain link which is only insignificantly larger than the hollow rail which receives the chain. Since the toggle after it has been inserted automatically opens again and places itself crosswise as a result of the pivoted connection, unintentional opening of the chain is practically out of the question.

In order to facilitate the swinging of the toggle and the insertion of the chain into the hollow rail, a transverse pin to which the end of the chain is pivoted is preferably fastened in the hollow rail.

In accordance with another proposal of the invention, the chain can be provided at predetermined distances apart with a plurality of circular chain links for the passage of the toggle in order in this way to adapt the length of the chain at the same time to the length desired.

Further securing of the chain can be obtained in the manner that, in accordance with a preferred embodiment of the invention, both ends of the chain are provided with a toggle and the circular chain links are arranged symmetrically with respect to the ends of the chain.

One illustrative embodiment of the invention will be explained in further detail below with reference to the drawing, in which.

Figure 1:
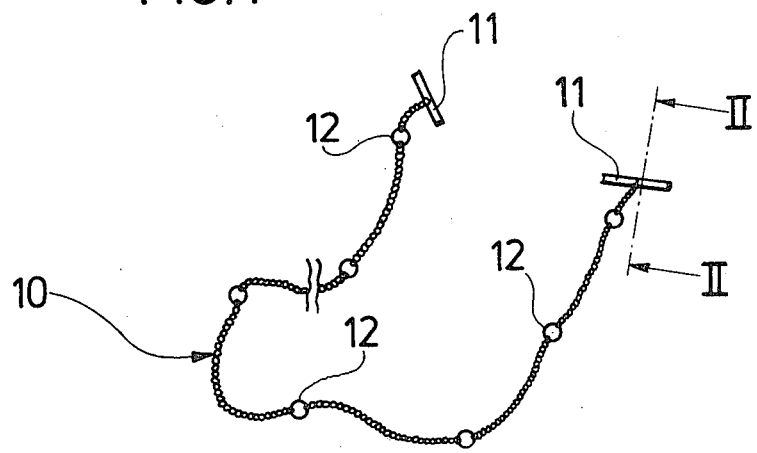
FIG. 1 is a schematic view of the chain of the invention.

The chain 10 shown in the drawing is a fine-link jewelry chain which is provided on both ends with a toggle 11. A plurality of chain links 12 of circular shape are preferably interposed in the chain 10, said links being at an equal distance from each other and being preferably arranged symmetrically to the ends of the chain.

Figure 2:
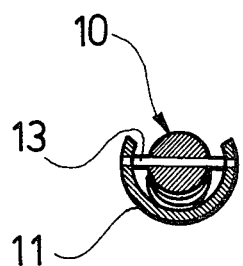
FIG. 2 is a cross section through the toggle along the section line II—II of FIG. 1, shown on a larger scale.
Figure 3:
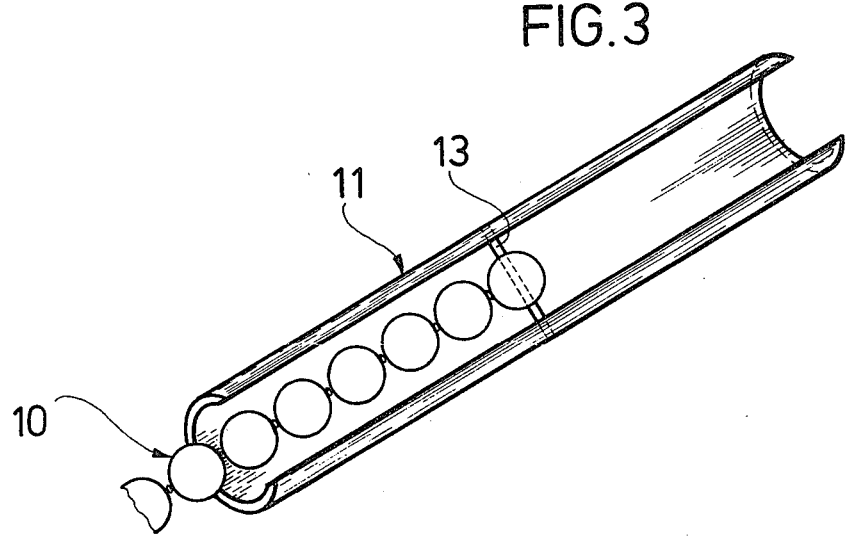
FIG. 3 is a perspective view of the toggle.

As can be noted from FIG. 2, the toggle 11 is developed as a hollow rail of substantially semi-circular cross section in the center of which there is fastened a transverse pin 13 to which the corresponding end of the chain is pivoted. The free open cross section (i.e., the open area inside of and defined by the inner periphery of the toggle) of the hollow rail is of such size that in the region beyond the circular chain links 12 the chain is substantially completely contained within its hollow during a fastening-unfastening transitional position (for example for and during insertion or removal, respectively, through a chain link 12). The diameter of the circular chain links 12 therefore need be only insignificantly larger than the outside diameter of the hollow rail. The distance from the first circular chain link 12 to the end of the chain or to the transverse pin 13 is preferably only insignificantly greater than half the length of the hollow rail so as to keep the play of the toggle as small as possible when the chain is closed.

I claim:

1. A chain with toggle fastener, comprising
   a chain having ends, said chain defining a cross-sectional outer periphery,
   at least one toggle being formed as a hollow rail defining therein a longitudinally extending open cross-section,
   one of said ends of said chain is pivotally connected to and in said hollow rail of said toggle,
   said open cross-section corresponds substantially to the cross-sectional outer periphery of an end portion of said chain adjacent said one end,
   said end portion of said chain is selectively containable in said open cross-section of said hollow rail in a fastening-unfastening transitional position of said end portion relative to said hollow rail and extends out from said open cross-section of said hollow rail in other positions of said end portion relative to said hollow rail.

2. The chain according to claim 1, wherein
   a transverse pin is fastened in said hollow rail,
   said one end of said chain is pivotally mounted on said pin.

3. The chain according to claim 2, wherein
   said transverse pin is mounted centrally in said hollow rail.

4. The chain according to claim 1, wherein
   said chain includes a plurality of ring-like chain links defining an opening constituting means for said toggle to pass therethrough, said chain links are disposed on said chain at predetermined distances apart from each other.

5. The chain according to claim 4, wherein
   each of said ends of said chain are pivotally connected to one said toggle, respectively and
   said chain links are arranged symmetrically with respect to said ends of said chain.

6. The chain according to claim 4, wherein said chain links have an inner diameter insignificantly greater than an outer diameter of said hollow rail.

7. The chain according to claim 4, wherein one of said chain links closest to said one end is spaced from said one end by a distance slightly greater than the distance of said one end to a furthest end of said toggle.

8. The chain according to claim 4, wherein said chain links are circular.

9. The chain according to claim 1, wherein said hollow rail has a substantially semi-circular cross-section defining a longitudinal slot having a width greater than the outer periphery of said chain, whereby said chain can pass into said hollow rail.

10. The chain according to claim 1, further comprising a chain link mounted substantially at the other end of said chain defining an opening greater than the cross-sectional thickness of said hollow rail.

* * * * *